UNITED STATES PATENT OFFICE.

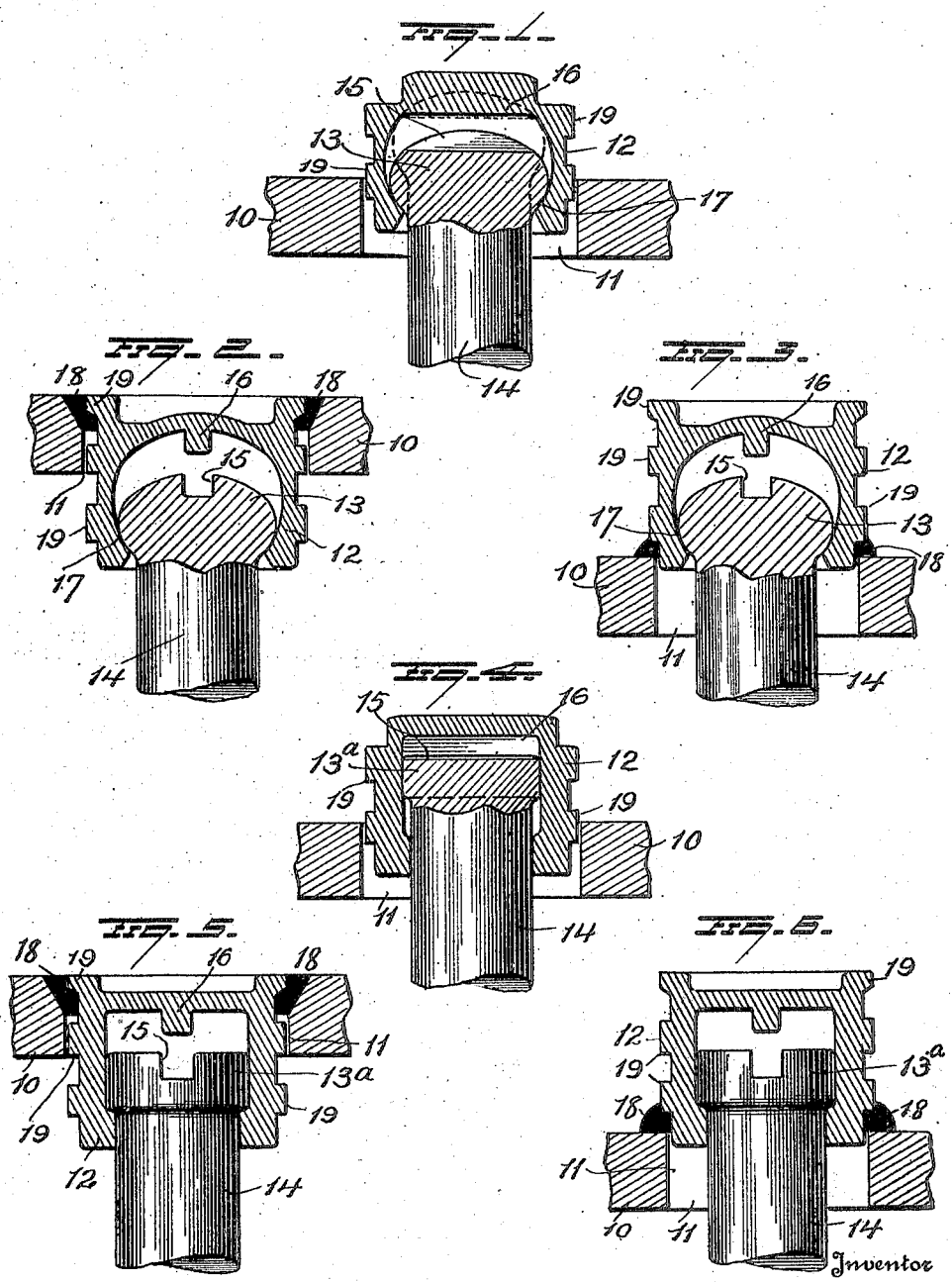

ETHAN I. DODDS, OF CENTRAL VALLEY, NEW YORK, ASSIGNOR TO FLANNERY BOLT COMPANY, OF PITTSBURGH, PENNSYLVANIA.

STAY-BOLT STRUCTURE.

1,417,149. Specification of Letters Patent. Patented May 23, 1922.

Application filed February 16, 1921. Serial No. 445,457.

*To all whom it may concern:*

Be it known that I, ETHAN I. DODDS, a citizen of the United States, and a resident of Central Valley, in the county of Orange and State of New York, have invented certain new and useful Improvements in Stay-Bolt Structures; and I do hereby declare the following to be a full, clear, and exact description of the invention, such as will enable others skilled in the art to which it appertains to make and use the same.

My invention relates to an improvement in staybolt structures, the object being to provide improved means for adjustably and permanently securing a stay bolt bearing member to the outer sheet of a boiler and for securing the head permanently within said bearing member and it consists in the parts and combinations of parts and in the details of construction as will be more fully explained and pointed out in the claims.

In the accompanying drawings, Figure 1 is a view in section showing the bearing member secured to the head and adjusted with relation to the outer sheet but not secured in place; Figures 2 and 3 are similar views showing various adjustments of the bolt bearing member and the latter permanently secured in place; Figure 4 is a view similar to Figure 1 of a slightly modified form of bolt and Figures 5 and 6 are similar views showing it permanently secured to the outer sheet of a boiler.

10 represents the outer sheet of a boiler provided with a bolt opening 11 cylindrical in shape and 12 is a bolt bearing member the diameter of which when attached to the bolt is slightly less than the diameter of the opening 11, so that it may be adjusted to any position within said opening. This bolt bearing member is adapted to receive the head 13 of the bolt 14, and before the bolt and its bearing member are assembled, the opening in the inner end of the latter is of greater diameter than the head 13 to permit the latter to be passed into the bearing and is then permanently secured therein by forging or compressing the lower end of the bearing member to close it around the head as shown in Figure 1. The surface of the bolt bearing member on which the head bears is rounded or curved and the head 13 is similarly curved so that the head has a universal movement on its bearing surface and is free at all times to move thereon. The cavity in the bolt bearing member 12 is of greater depth than the depth of the head, and the latter is provided in its outer edge with a slot or groove, adapted to be engaged by the rib 16 formed on the inner surface of the bearing member at the outer end thereof, so that in assembling the parts the rib 16 can be entered in the groove 15 in the head whereby the bolt may be turned by a wrench or other tool to screw the inner end (not shown) of the bolt 14 into the inner sheet, in the usual manner, or if the inner end of the bolt be passed through the inner sheet and upset against the outer face of the sheet, which is also a common practice, the bearing member is used as the driving head for the bolt. After the bolt has been secured to the inner sheet of the boiler the bearing member is pulled outwardly as in Figures 1, 2 or 3 until the seat 17 is in firm contact with the underside of the head of the bolt, after which the bearing member 12 is welded as at 18 to the outer sheet 10, as shown in Figures 1, 2 and 3. This construction permits of the use of a bolt of one size for connecting boiler sheets where there are varying spaces between the latter within the limits, of course of the depth of the bearing member.

This bearing member is preferably provided as shown with peripheral ribs 19 which when engaged by the weld 18 so connect the bearing member to the sheet that the latter can be dislodged only by a shearing cut or stress which, under ordinary conditions, could never be sufficient to dislodge the bearing member.

The construction shown in Figures 4 and 5 is substantially identical with the one previously described except the bolt has a cylindrical head 13ª and the bearing member has a cylindrical cavity to receive the head thus permitting endwise movement of the bolt as in the former construction, but preventing lateral deflection or universal movement of the bolt.

It is evident that many slight changes might be resorted to in the relative arrangement of parts shown and described without departing from the spirit and scope of my invention; hence I would have it understood that I do not wish to confine myself to the exact construction and arrangement of parts shown and described but, Having fully described my invention what I claim as new and desire to secure by Letters-Patent, is:—

1. In a staybolt construction, the combination of an outer sheet of a boiler having a bolt opening therein, a bearing member of less diameter than the bolt opening, and a bolt permanently attached to the bolt bearing member, the bearing member being secured to the boiler sheet by welding.

2. In a stay bolt construction, the combination of an outer sheet having a bolt opening therein, a bearing member of less diameter than the bolt opening and adapted to be adjusted within said opening, and a bolt permanently attached to the bearing member, the bolt bearing member being permanently secured in its adjusted position by welding it to the outer sheet.

3. In stay bolt construction, the combination of a bearing member adapted to rest within an opening in the outer sheet of a boiler and be secured therein by welding, the bearing member being of less diameter than the said opening whereby it may be adjusted longitudinally therein prior to welding, and a bolt having a head, the bearing member having a cavity to receive the head and secured thereto, the head of the bolt being provided with a slot and the bearing member provided internally with a rib to enter said slot whereby the bolt may be turned to secure it to the inner sheet of a boiler.

4. In a stay bolt construction, the combination of a bearing member adapted to be welded within an opening in a boiler sheet and a bolt having a head, the bearing member being permanently connected with the bolt, the said member being provided internally with a seat for the head of the bolt and externally with peripheral projections, the latter being of less diameter than the opening in the boiler sheet, whereby the bearing member may be properly adjusted in the boiler sheet before it is permanently attached to the latter by welding.

5. In staybolt construction, the combination of a boiler sheet having a bolt opening therein, a bearing member provided with peripheral projections, the said bearing member being of less diameter than the bolt hole and secured therein by welding it to the sheet, and a bolt having a head mounted for movement in said member, the said bolt being permanently attached to said member.

In testimony whereof, I have signed this specification in the presence of a subscribing witness.

ETHAN I. DODDS.

Witness:
EDWIN S. RYCE.